(12) United States Patent  
Ghorbani et al.

(10) Patent No.: US 8,160,855 B2
(45) Date of Patent: Apr. 17, 2012

(54) SYSTEM AND METHOD FOR SIMULATING NETWORK ATTACKS

(75) Inventors: Aliakbar Ghorbani, Fredericton (CA); Iosif Viorel Onut, Ottawa (CA); Natalia Stakhanova, Fredericton (CA); William Bird, Fredericton (CA)

(73) Assignee: Q1 Labs, Inc., Waltham, MA (US)

( * ) Notice: Subject to any disclaimer, the term of this patent is extended or adjusted under 35 U.S.C. 154(b) by 481 days.

(21) Appl. No.: 12/147,429

(22) Filed: Jun. 26, 2008

(65) Prior Publication Data

US 2009/0326899 A1    Dec. 31, 2009

(51) Int. Cl.
*G06F 17/50*    (2006.01)

(52) U.S. Cl. .................... 703/13; 709/224; 370/254

(58) Field of Classification Search .............. 703/6, 13, 703/21
See application file for complete search history.

(56) References Cited

U.S. PATENT DOCUMENTS

| | | | |
|---|---|---|---|
| 5,821,937 A * | 10/1998 | Tonelli et al. | 715/853 |
| 5,923,849 A * | 7/1999 | Venkatraman | 709/224 |
| 6,393,386 B1 * | 5/2002 | Zager et al. | 703/25 |
| 7,315,801 B1 * | 1/2008 | Dowd et al. | 703/13 |
| 7,509,405 B2 * | 3/2009 | Hubbard | 709/223 |
| 7,568,019 B1 * | 7/2009 | Bhargava et al. | 709/223 |
| 7,756,046 B2 * | 7/2010 | Habu et al. | 370/245 |

* cited by examiner

*Primary Examiner* — Mary C Jacob
(74) *Attorney, Agent, or Firm* — Goodwin Procter LLP

(57) ABSTRACT

A method of simulating network activities includes building a model of the network, the model including data retrieved over a predetermined period of time. The method further includes running a plurality of queries against the model to determine their impacts on the network.

12 Claims, 8 Drawing Sheets

SYSTEM AND METHOD FOR SIMULATING NETWORK ATTACKS

FIELD OF THE INVENTION

This application relates generally to data network security, and more particularly to simulating network attacks.

BACKGROUND OF THE INVENTION

The Internet growth, information sharing, and technology improvement are some of the factors that human society has become dependent on. The massive amount of data available on the Internet has created a new type of cyber crime that targets confidential, personal, and mission critical data. Internet fraud is amplified by the variety of tools that are available on-line for malicious purposes. While in the past a hacker needed to have a considerable amount of knowledge to perform a simple intrusion, today, an attack can be carried out at a click of a button.

To counteract attacker's activities, various companies and researchers around the world design and employ Intrusion Detection Systems (IDS) and Intrusion Protection Systems (IPS) that are used to detect and isolate an attack from the rest of the network. One of the challenges in this context is configuring attack detection and containment tools to allow proper intrusion detection and response without sacrificing the normal functionality of the rest of the network. Such configuration requires a careful assessment of system characteristics and potential risk factors, which is typically performed by a system analyst. However, with the rapid increase in the size and complexity of systems in recent years the manual approach is no longer feasible.

While some research has been done into the role of modeling and simulation to computer security, there remains a lack of sound and comprehensive tools for security modeling and simulation.

SUMMARY OF THE INVENTION

A network simulation tool is described herein which allows comprehensive analysis of network security through modeling the impact of attacks and potential network changes introduced by the administrator. The simulation model relies on the statistical analysis of network traffic, that includes the number of flows between hosts, number of hosts, probabilities associated with host behavior, etc.

In one aspect of the disclosure, a method of simulating network activities is provided. The method includes building a model of the network using the data retrieved over a predetermined period of time. The method further includes running a plurality of queries against the model to determine their impact on the network.

DETAILED DESCRIPTION

A network simulation tool and methods for simulating network activities are described herein. The disclosed simulation tool and methods provide for comprehensive analysis of network security by modeling the impact of attacks and potential network changes introduced by a network administrator. Simulation models may be created based on the statistical analysis of network traffic (including the number of flows between hosts, the number of hosts, probabilities associated with host behavior), security data generated by third party devices (e.g., known vulnerabilities, intrusion detection systems alerts, etc.), and the network information provided by the administrator (e.g., network topology, configuration of the hosts, firewalls, etc.).

Figure 1:
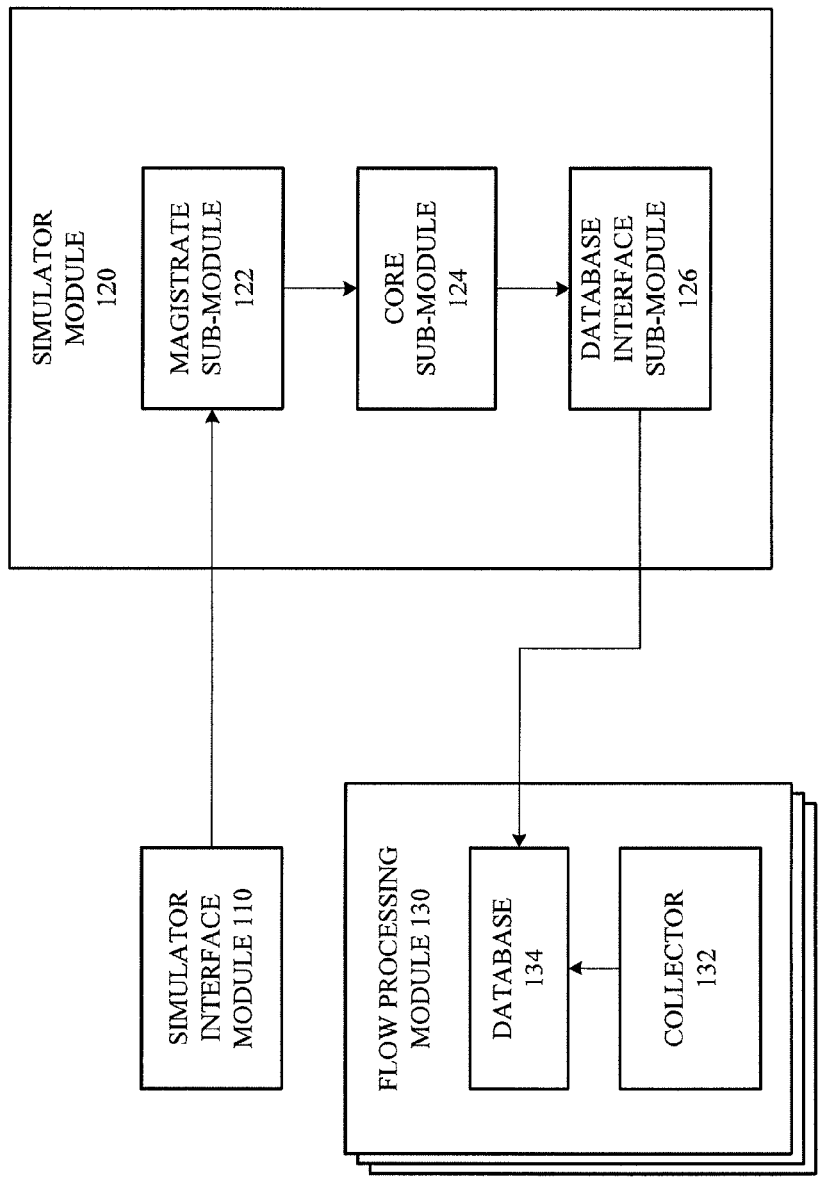
FIG. 1 depicts an overall simulator framework in accordance with various disclosed embodiments.

FIG. 1 depicts an overall framework for a network simulation tool 100. Network simulation tool 100 may include one or more simulator interface modules 110, a simulator module 120, and one or more flow processing modules 130. Simulator interface modules 110 can be configured to provide a graphical user interface (GUI), which allows a user to configure various simulation requests, and to display the simulation results. In accordance with some embodiments, multiple consoles may be deployed for configuring simulation request and displaying results. As such, more that one simulator interface module 110 may be provided.

The simulator module 120 may include a simulator magistrate sub-module 122, simulator core sub-module 124, and database interface sub-module 126. Simulation magistrate sub-module 122 may be configured to convert queries received via the simulation interface modules 110 into a predefined simulator language format. Additionally, the simulation magistrate sub-module 122 may be configured to handle the scheduling of certain system generated queries and to maintain an execution history of all previous queries. This enables a user to incrementally navigate forward and backward during a simulation.

The simulator core sub-module 124 may be configured to extract data for running a query and also for constructing the simulation models and mining the data. Queries may be executed on demand upon receipt of a magistrate request. Database interface sub-module 126 may be configured to query the data out of multiple flow processing modules 130 that may be distributed in the network. The database interface sub-module 126 will query the data from each database 134 of flow processing modules 130. The database interface sub-module 126 has two functionalities: First, it may provide an interface to each of the databases 134. Second, it may merge data and remove the inconsistencies and redundancies of data received from multiple collectors 132.

Each of flow processing modules 130 may include a collector 132 for collecting data needed to process a simulation task. Collector 132 may be configured to build a basic network model of the network traffic it sees. Data may be transferred between the collector and the simulator core via database 134. Database 134 and collector 132 may be distributed, and database interface sub-module 126 may collect data from all the distributed databases 134 and remove inconsistencies from the distributed collectors 132. While collector 132 and simulation magistrate module 122 are being deployed separately, they may be employed on the same box.

Queries may be used to model the impact of attacks on the network and potential changes to the network. Queries may be administrator/user-driven or system-driven. Administrator/user-driven queries may be directed to modeling potentially vulnerable network states based on conditions provided by the administrator/user. Administrator/user queries may be thought of as "what if" questions. That is, these queries may be used to model potential scenarios. For example, administrator/user queries may be directed to what would happen if there were a spread of a worm through the network, a threat from inside or outside the network, modifications to the network, firewall events, and/or any other potential scenarios. Results of these queries may include detailed information representing potential network effects, which may include the affected services, hosts, assets, etc. Administrator/user queries may also include possible related questions, allowing a user to explore different dimensions of the network effect of the query. Some related questions may relate to a current query even if they are not dependent on the query result. For example, if the original query inquires about the effect of a vulnerability exploited on a host, then a related question may be associated with the removal of this host from the network. Other related questions may be dependent upon the results of an original query. For example, if an original query asks about opening a new service on a host, a related question may be asked about worm propagation through this service.

System-driven questions may be configured to supply information about the network state. These queries may be pre-programmed into the system, and launched in response to underlying changes in the state of the network, such as the addition of a new vulnerability to the database, or may be periodically triggered according to a defined schedule. The system-driven questions may be thought of as "did you know" questions. That is, these questions direct a user to events occurring in the network that the user should be aware of. For example, system-driven queries may relate to observed behaviors of certain nodes in the network. In accordance with some embodiments, system-driven questions may also have associated therewith related questions, which may be viewed at the request of a user. In some embodiments, new system-generated questions may be created based on the results of administrator/user driven questions.

Figure 2:
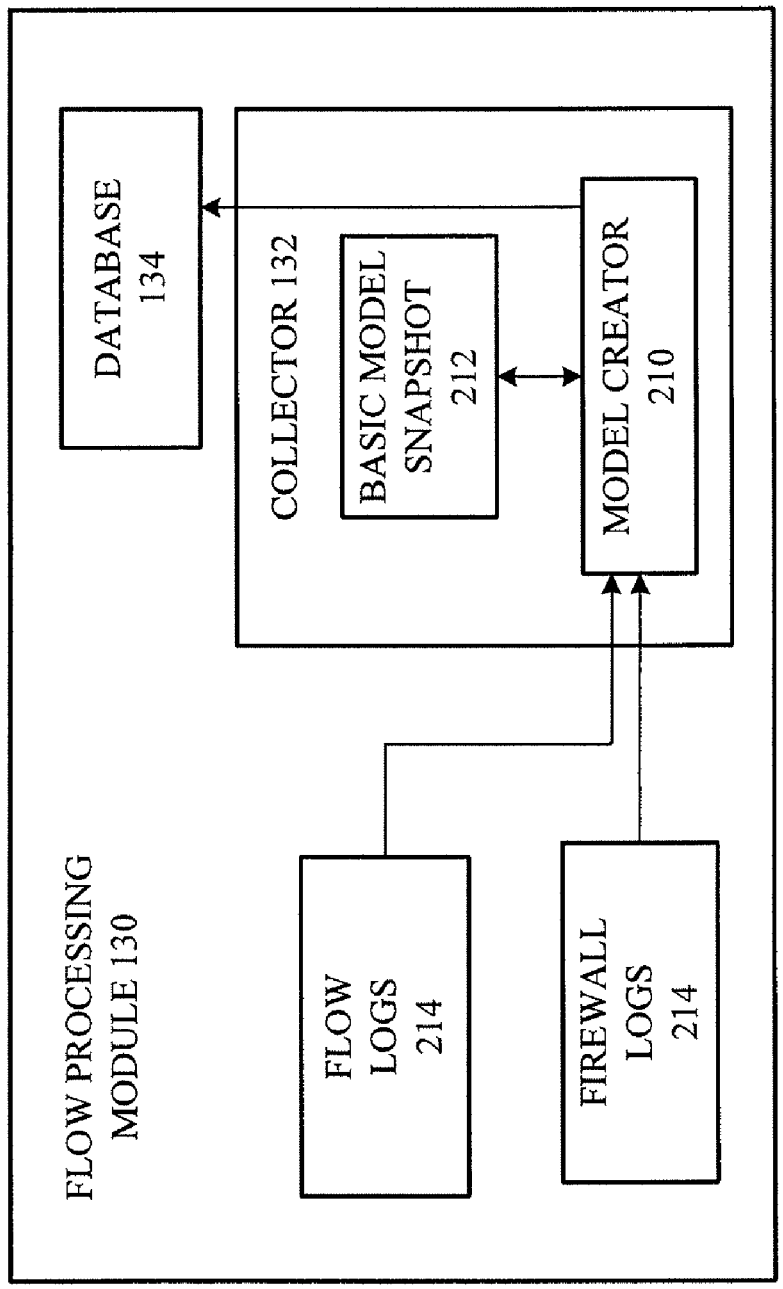
FIG. 2 depicts an example of the flow processing module illustrated in FIG. 1.

A more detailed description of the components of network simulator 100 will now be provided. An example of a flow processing modules 130 is depicted in greater detail in FIG. 2. As described above, each of flow processing modules 130 may include a collector 132 and a database 134. Collector 132 may further comprise a model creator 210. One function of collector 132 is to construct a basic model of observed network traffic. The basic model is created by model creator 210 based on data extracted from network and/or third party devices (e.g., intrusion detection systems, firewalls, sniffers, etc.). Data may be obtained in the form of flow logs 214, firewall logs 216, direct flow sniffing, and/or any other data format. Flows refer to the information exchange process between two devices. A flow may be bi-directional or unidirectional, and may be uniquely defined by a source IP address, source port (if applicable), destination IP address, destination port (if applicable), and protocol. Model creator 210 uses the obtained data to create a current snapshot 212 of the network. The current snapshot 212 is maintained for a predefined time period, and upon expiration of this time period, the data is passed on to database 134. The snapshot is then cleared and a new snapshot may be created. Thus, the consistency of the stored information is maintained.

Figure 3:
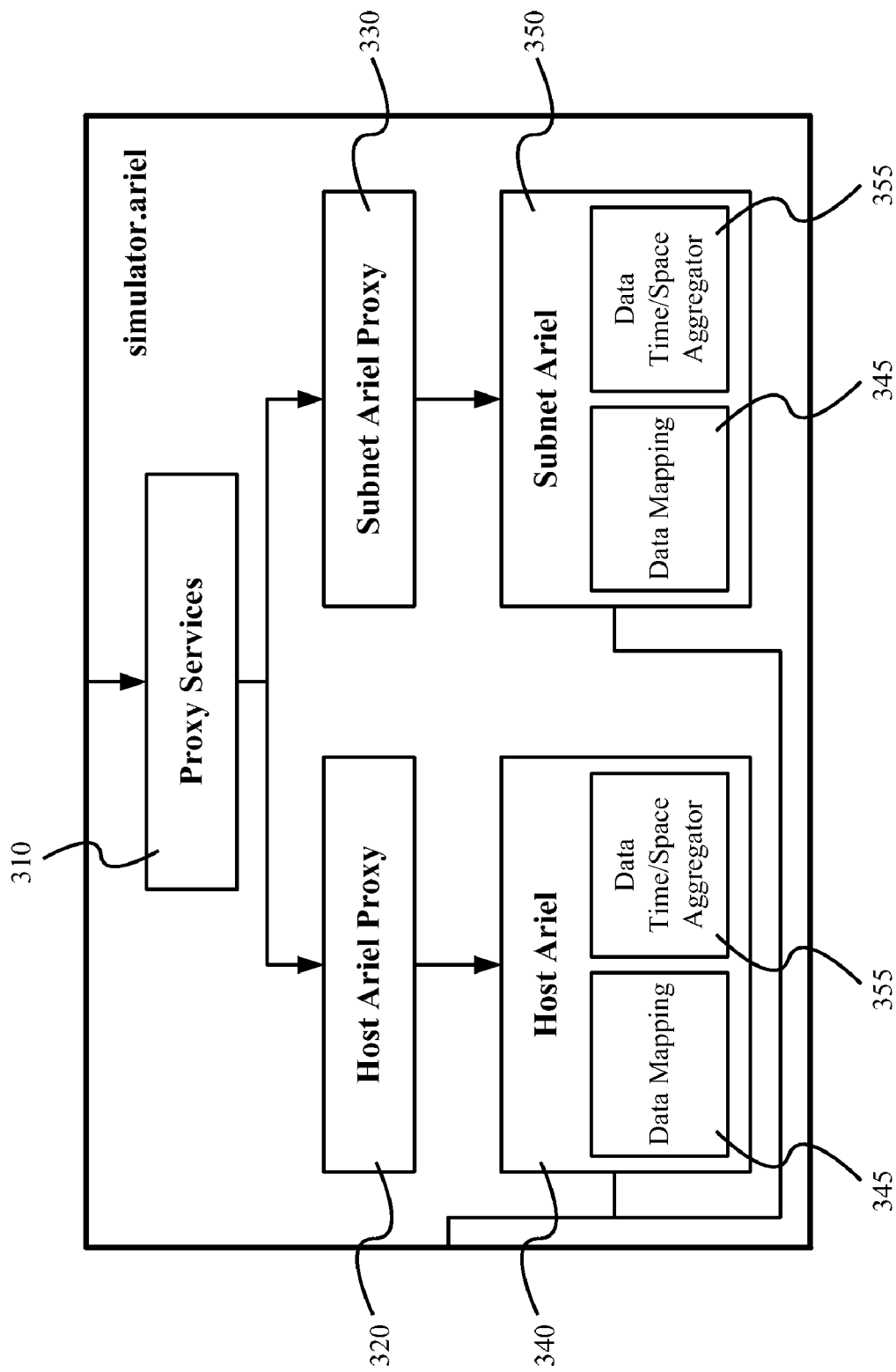
FIG. 3 depicts a database interface module.

As described above, simulator module 120 may include a simulator magistrate module, a simulator core module, and a database interface module. As depicted in FIG. 3, a database interface sub-module 126 may comprise proxy services 310, host database proxy 320, subnet database proxy 330, host database module 340, and subnet database module 350. Host database module 340 and subnet database module 350 may each include a data mapping sub-module 345 and a data time/space aggregator 355.

Upon receipt of a query request from the simulator core module, proxy services 310 may be configured to redirect the request to the appropriate processing module. Host database module may contain data about hosts on the existing network while subnets database module contains data about the subnets existing on the network. Data-mapping sub-module 345 may be provided for describing how data is mapped from an object to the disk and back. Data time/space aggregators 355 may be configured to define the procedures for aggregating data received from multiple flow processors. The data integration is in space (multiple flow processors) and time (the query may refer to a particular time period, e.g., 2 weeks).

Figure 4:
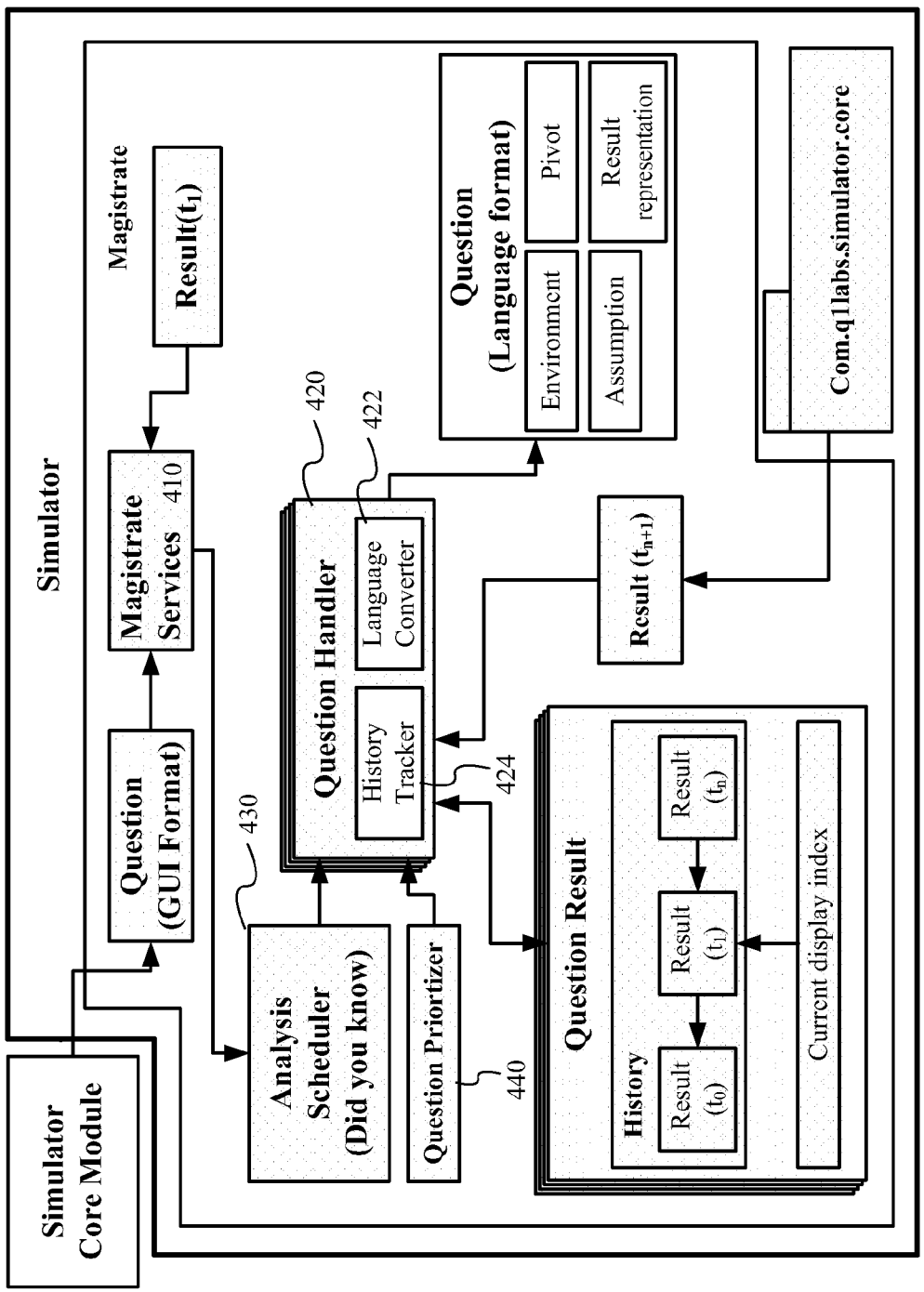
FIG. 4 depicts a simulator magistrate module.

FIG. 4 depicts a simulator magistrate module in detail. The simulator magistrate module receives query requests from the simulator interface module, and transforms the queries into a predefined question format used by the simulator. The simulator magistrate module may also be configured to monitor simulation results. Magistrate services sub-module 410 may be configured to receive a query from the simulator interface module. The query may then be provided to a question handler 420, which converts the query into a pre-defined question format and tracks simulation results history for each question.

Question handler 420 may include a language converter 422 for transforming the queries into the predefined format. In accordance with some embodiments, questions may be formatted to include several types of data. For example, a formatted question may include question environment data, which describes the scope of the question with respect to the available data. For example, one question may be focused on a particular service, a particular machine, a particular subnet, or a particular firewall, or any combination thereof. Question assumption data may be included to define any assumptions associated with the current question. More particularly, it describes the parts of the real environment that need to be overwritten by the question. For example, assuming port x on host y is in reality open, the question asks to see the impact of closing that port, the assumption indicates that port x is closed on host y.

Question pivot data may be provided which defines the starting point of a question and the method in which the query will be executed. For example, in the case of a worm spread, the initial spreading point may be specified, as well as the execution method. The query may be executed iteratively, exhaustively, or in some other manner. Question result representation data specifies the type of data that should be returned by the simulation. For example, data may be returned alphanumerically, as a chart, as a graph, and/or or a combination of formats.

Question handler 420 may also include a history tracker 424. The history tracker may be configured to build a question result profile for each question. That is, each time a result is received from the simulator core module, it may be stored in a result history database. This allows the simulator to transparently implement a navigable behavior for incremental questions only requiring the invocation of the simulator core module once per each step. A current display index indicates the current position of the simulator within the simulation results. Thus, the simulator may compute the simulation results several steps ahead of the current position.

Each of the simulation queries may also be configured to be launch on a scheduled basis. For this purpose, the Magistrate Services 410 may forward the schedule of each query to the Analysis Scheduler 430. The Analysis Scheduler 430 may keep track of all the question schedules and may be configured to notify the appropriate question handler on time of the query execution. Due to the fact that multiple executions may overlap in time, the Question Prioritizer 440 may be configured to prioritize the execution of various simulation queries based on their priority. The priority of a question may be computed based on the difficulty of the question, its importance, the request waiting time, and/or any other factors.

Figure 5:
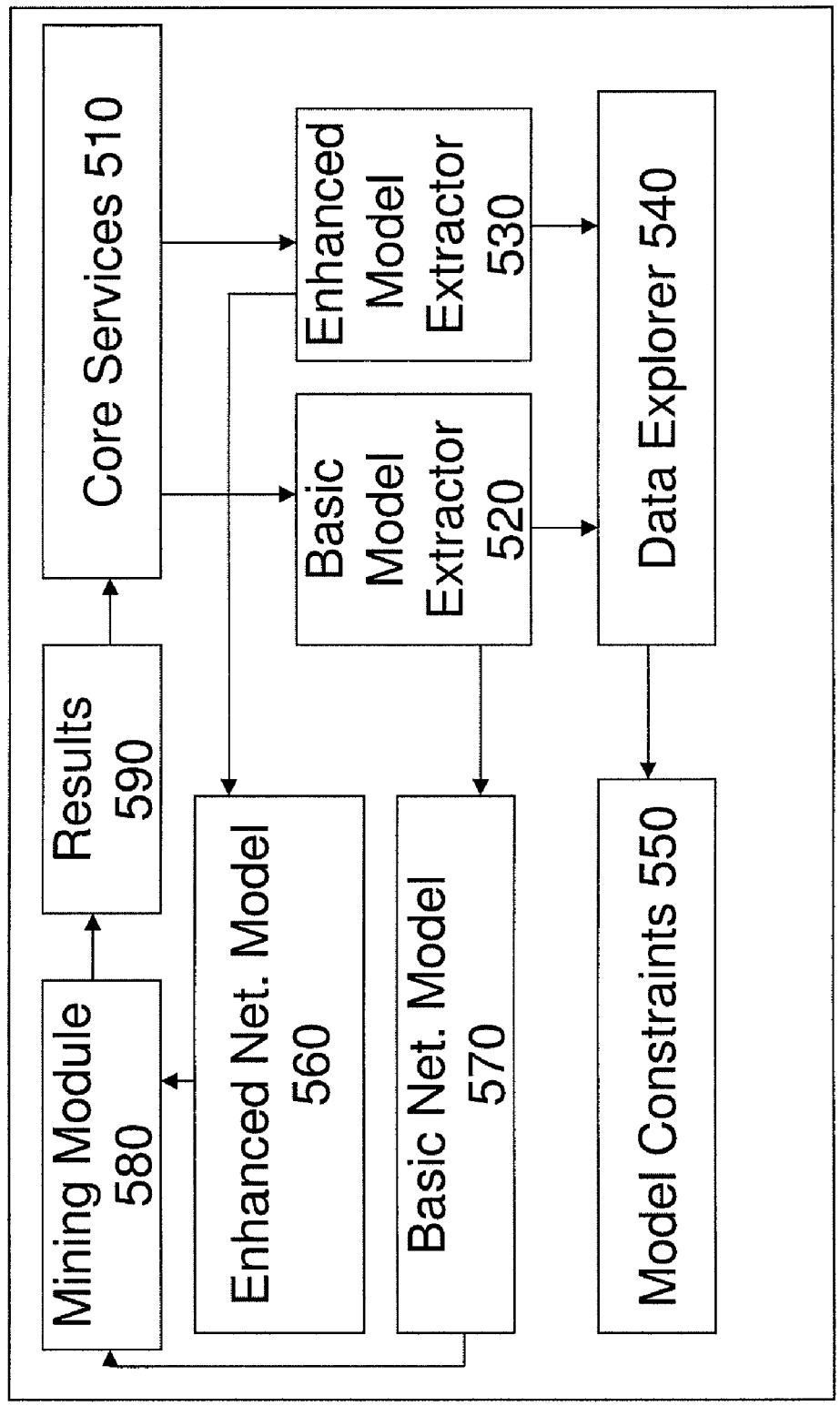
FIG. 5 depicts a simulator core module.

FIG. 5 depicts a simulator core in greater detail. Core services sub-module 510 may be provided as an interface between the simulator core module and the simulator magistrate module. The core services sub-module 510 may be configured to keep track of questions received by the core as well as the generated question models. Upon receipt of a question, core services module 510 may pass the question to a basic model extractor 520 and an enhanced model extractor 530. These modules may be configured to build question models based on the received simulation question. Data needed to process a query may be stored in multiple databases. Accordingly, basic model extractor 530 and enhanced model extractor 530 may use data explorer module 540 to locate and retrieve the necessary data. Data explorer module 540 has access to all databases storing the needed data. One example of a database may be the database interface sub-module 126 depicted in FIG. 1, which is used to query the distributed data stored in the database 134.

Furthermore, another example of one database, which may include data needed to execute a query, is the model constraints 550 database. This database may be configured to store a set of user definable rules that can overwrite any inferred knowledge by the simulator, as needed. For example, if the simulator infers that a port is open while the network administrator indicates otherwise, the administrator can override the inferred data by adding a constraint to the database.

Upon extraction of the necessary data by basic model extractor 520 and enhanced model extractor 530, an enhanced network model 560 and a basic network model 570 may be created. The generated network models may then be forwarded to mining module 580, which computes the simulation results 590 for the current query. The results are then sent back to the simulation magistrate module via core services sub-module 510.

Next, methods of building the basic and enhanced network models will be described. A basic network model may be built that represents a first tier in the simulation process. The basic network model may be viewed as a repository of basic network information. It may be created and updated based on data extracted from both the network and third party devices. The basic network model may include nodes representing each distinct host in the network. The nodes may be annotated by the IP address of the host device. Arcs between nodes denote directed communication paths between two nodes.

Communication in a network can be distinguished as communication between internal nodes of the network and as communication between internal nodes and the nodes that do not belong to the network (external nodes). According to some embodiments, individual nodes need not be created in the basic network model for each external node. Rather, information describing external nodes involved in the communication with the internal nodes may be grouped together. Statistical data describing the observed traffic between hosts on the network may be stored in the corresponding nodes and arcs of the graphs. This statistical data may include, for example, packets in/out, bytes in/out, available protocols, open ports, and/or any other statistical data.

Basic network models provide only limited information about the network. For more advanced network simulation, enhanced network models may be created which include information on the flow of communication as well as on the existing vulnerabilities in the network. In accordance with some embodiments, an enhanced network model may include a plurality of topologies, such as a flow topology, a connectivity topology, a vulnerability topology, and an access control device topology.

Flow topology information may be used to represent a topological view of the network flows seen in the past on the current network. The flow topology may be thought of as a directed graph, which includes internal network nodes and arcs representing the flows between them. Each arc may include information from all flows that have the same source IP address, source port number, destination IP address, destination port number, and protocol. Each node and arc may be annotated with probabilities indicating the past behavior. For example, node probability represents the probability of a host to be online on the network, and can be computed as follows:

$$Prob(node_j) = \frac{\sum_{h \in TimePeriod} hostStatus(h)}{TimePeriod} \quad (1)$$

Figure 6:
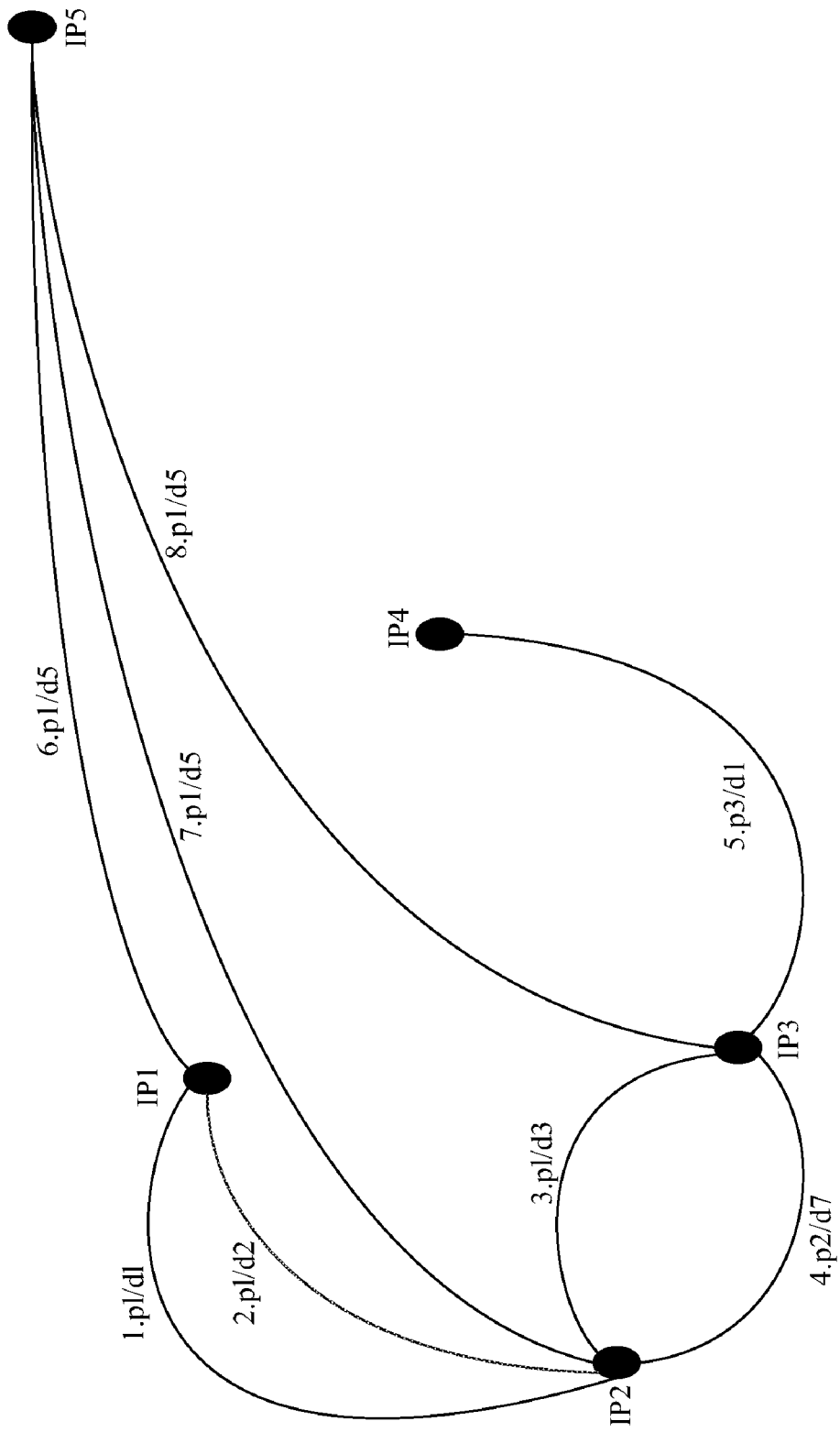
FIG. 6 depicts an example of a flow topology.

In equation (1), hostStatus(h) is a binary value that indicates whether the host (node$_j$) is online during hour h and TimePeriod is a period of time indicated in the configuration settings. The arc probability represents the ability of the source node to communicate with the destination node using a specified port and protocol. However, as the arc probability refers to actual flows seen in the past, the value of each created arc is set to 1. An example of a flow topology is presented in FIG. 6. Nodes have been created and labeled IP1 to IP5. Arcs are shown connecting those nodes for which an actual flow has been seen in the past. For example, a flow has been seen between nodes IP3 and IP4 using port 3 and destination protocol d1.

Connectivity topology may be generated to indicate potential connections on the network. That is, the connectivity topology represents connections that were not observed in the past, but can potentially be made. The connectivity topology may be constructed on top of the flow topology by introducing phantom connectivity arcs and phantom port arcs. A phantom connection may exist where a majority of hosts in a subnet are connecting to a particular host on a particular port. Thus, because the majority of hosts are able to connect to the host on the particular port, it is likely that any host within the subnet can connect to the host on the port, even where such communication has not been previously seen.

A phantom connectivity arc indicating phantom connectivity between hosts may be annotated with a probability that represents the percentage of nodes on the network that connect to the host using the specified protocol/port. The probability of a phantom connectivity arc PCarc existing from a particular network to a host can be computed as follows:

$$Prob(PCarc) = \frac{\sum_{client \in Network} client}{hostNumber} \quad (2)$$

Figure 7:
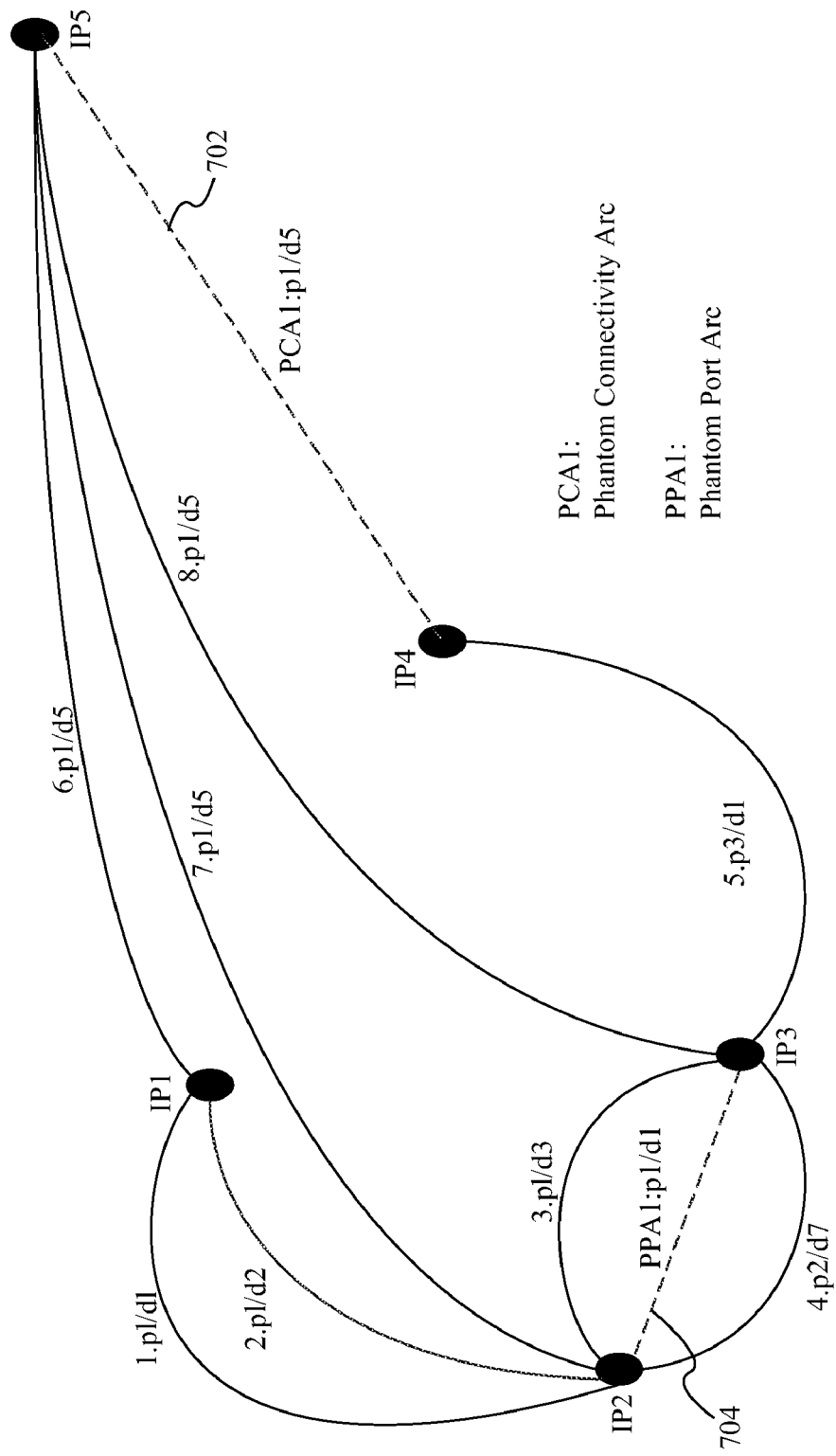
FIG. 7 depicts an example of a connectivity topology.

In equation (2), client is a host's client from the specified network Network and hostNumber is the total number of hosts on the considered network. Phantom ports refer to the situation where a first host has a set of open ports, not all of which are regularly used for communication with a second host. Although the second host may regularly communicate with the first host via a particular port, it can be inferred that the second host can also communicate via any of the other open ports. The probability of phantom port arc is equal to 1. Phantom port arcs may be used in the connectivity topology to represent phantom ports on a host. FIG. 7 depicts an example of phantom connectivity arcs and phantom port arcs built on top of the flow topology depicted in FIG. 6.

As depicted in FIG. 7, connections between IP5 and each of IP1, IP2, and IP3 have been observed. However, no connection has been observed between IP5 and IP4. However, it is likely that a connection can be made between IP4 and IP5 as they are on the same network. Thus, a phantom connectivity arc 702 exists between IP4 and IP5. Regarding phantom port arcs, assume IP3 has multiple open ports, but usually communicates with IP2 via port d3. It can be inferred that IP3 can also communicate with IP2 via another open port, such as port d1. Thus, phantom port arc 704 is shown between IP3 and IP2.

A vulnerability topology may also be created which provides information on all existing vulnerabilities in the current network. The vulnerability topology may comprise nodes representing network hosts, and phantom vulnerability arcs that denote the virtual path between two nodes. The phantom vulnerability arcs further indicate how a destination host can be compromised if a specified vulnerability is exploited on the intermediated nodes in the virtual path. The probability of a phantom vulnerability arc PVarc between two hosts can be computed as follows:

$$Prob(PVarc) = \frac{Prob(incomingArc) + (Prob(interNode) \times CVSSscore(V) \times AssetValue(interNode)) + Prob(outcomingArc)}{2 + (max(CVSSscore) \times max(AssetValue))} \quad (3)$$

In Equation 3, interNode is an intermediate vulnerable node on the path between hosts, and incomingArc and outcomingArc are arcs denoting incoming and outgoing connections from this intermediate node, respectively. CVSScore (V) is in the range of [1,10] and denotes a severity score of vulnerability V computed according to the CVSS score scheme. AssetValue is a host's asset value in the range of [1,10] configured by administrator to indicate host's importance in the network. The denominator of the formula is a scaling factor necessary to normalize the Prob(PVarc) value in the range of [0,1]. Thus, the value '2' stands for the sum of maximum values of node and arc probability, both equal to 1. Further, max(CVSScore) and max(AssetValue) represent the maximum values of the CVSS score, and the AssetValue, which are equal to 10.

Figure 8B:
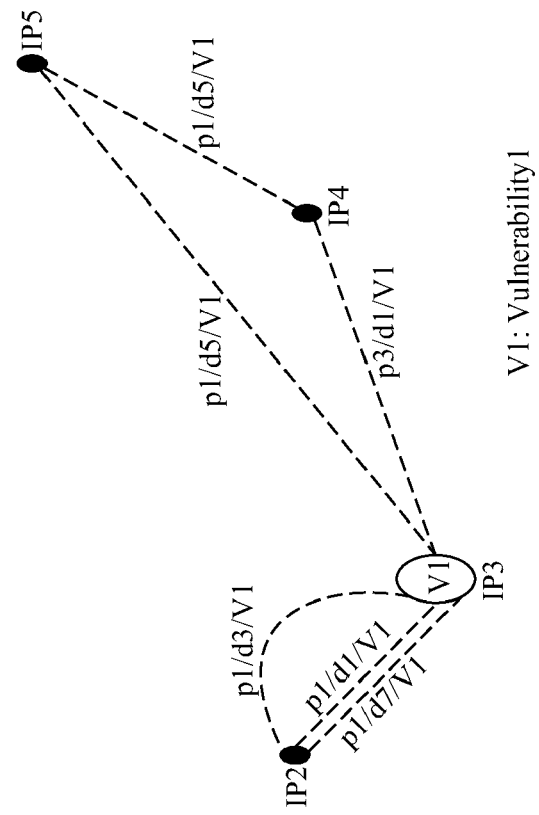
FIGS. 8A and 8B depict an example of a vulnerability topology.
Figure 8A:
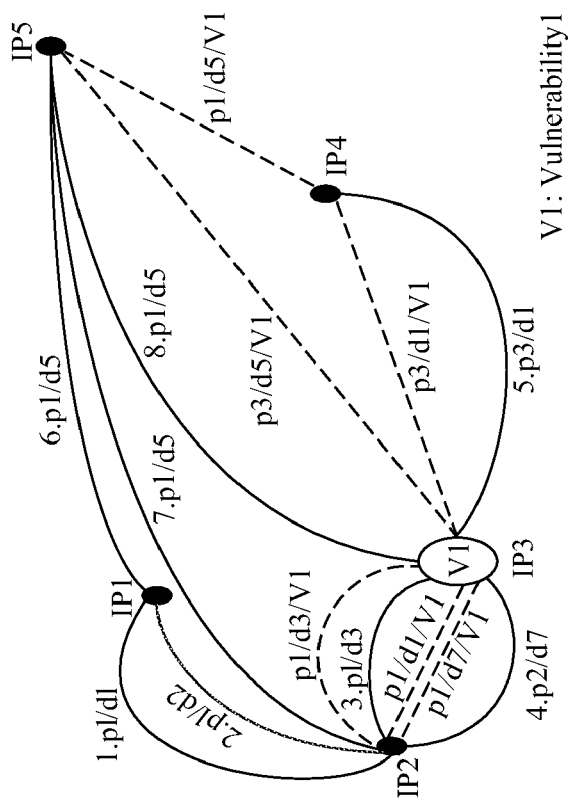

An example of the vulnerability topology based on the flow and connectivity topologies and the view of the Vulnerability topology without the underlying connectivity structure are depicted in FIGS. 8A and 8B, respectively.

Access control device topologies may include information on the configuration of an access control device, such as a firewall, router, VPN, intrusion prevention system (IPS) or any other in-line device that would create a point in the network where traffic can be blocked or modified based on a defined set of rules. In the case of a firewall or router, the models created will be based on IP and Port combinations, where as in an IPS the models will be build to block or allow specific vulnerabilities or applications, which may or may not be port or IP specific. According to some embodiments, access control device topologies may be created based on information received from the access control device logs. The access control device topology provides a map of which devices can and cannot communicate with other devices.

In some embodiments, access control device configuration information may be used to generate the topology and/or to validate a topology created based on log information. The access control device configuration may be built based on data provided by the network administrator, and also data that is actively and passively collected by the simulator from data logs and monitored traffic. For instance, in the case of a firewall, the access control device topology may be constructed based on the sniffed allowed/dropped traffic as well as firewall logs and administrator input. The sniffed data, log data and admin input data are complementary to each other, but may not be guaranteed to always exist. Despite this, the system will still be able to construct and use the access control device topology that will contain only partial data. In the case when all the data about an access control device is available, the seen traffic may also be compare against the defined/ specified behavior of the access control device for policy compliance.

Based on the generated network topologies, hosts as well as the general status of the network can be evaluated. One characteristic that may be estimated for a network host is the reachability of the node. This refers to the likelihood of the host to be reached, and the potential criticality of the path. The reachability of a node i may be computed as follows:

$$Reachability(Node_i) = \frac{\sum (Prob(arc) + Prob(node) \times AssetValue(node))}{\sum arc + node \times max(AssetValue)} \quad (4)$$

In Equation (4), arc and node indicated all arcs and nodes on the path to node i. In the situation where multiple paths exist, that path with the highest value is assigned as a node reachability score. An assessment of network vulnerability level may also be computed. This value indicates the criticality of the existing vulnerabilities for the network and can be computer as follows:

$$VulnerabilityLevel(Network) = \frac{\sum_{node_i \in Network} AssetValue(node_i) \times \left(\sum_{V \in node_i} CVSSscore(V)\right)}{numberOfHosts \times max(CVSSscore) \times max(VulnPerHost) \times max(AssetValue)} \quad (5)$$

In Equation (5), $node_i$ is a host on the network with the asset value assetValue which is given a value of 1 if the current host asset value is 0. The denominator represents the scaling factor necessary to transform the VulnerabilityLevel value into the range of [0,1]. As such the variable numberOfHosts represents the total number of hosts on the current network, max (CVSScore) represents the maximum value of the CVSS score, and max(VulnPerHost) represents the maximum number of vulnerabilities existing on the average host in the current network.

The reachability and vulnerability calculations may be used when simulating network conditions based on queries. For example, a query may be performed which attempts to evaluate the spread of a worm and its potential damage. A query model may be generated for this query based on flow and connectivity topologies. Results may include the reachability score for each step of the worm propagation. Queries related to the exploitation of a vulnerability of a host may be generated based on the vulnerability calculations.

It is apparent from the various embodiments described herein that aspects of the disclosed embodiments may be embodied, at least in part, in software. That is, the techniques may be carried out in a computer system or other data processing system in response to its processor, such as a microprocessor, executing sequences of instructions contained in a memory, such as ROM, RAM, non-volatile memory, cache, or a remote storage device. In various embodiments, hardwired circuitry may be used in combination with software instructions to implement the disclosed embodiments. Thus, the disclosed embodiments are not limited to any specific combination of hardware circuit and software not to any particular source for the instructions executed by the data processing system.

The previous description is provided to enable any person skilled in the art to practice the various embodiments described herein. Various modifications to these embodiments will be readily apparent to those skilled in the art, and the generic principles defined herein may be applied to other embodiments without departing from the broader spirit and scope of the invention as set forth in the following claims. The specification and drawings are, accordingly, to be regarded in an illustrative sense rather than a restrictive sense.

What is claimed is:

1. A method of simulating network activities, comprising:
    building a model of a network based on flow data records comprising application layer data representative of application layer data traffic communicated between applications executing on devices in the network, said model comprising nodes and communication arcs between said nodes representative of source and destination nodes identified in the flow data records; and
    running a plurality of queries against the model to determine an impact of one or more actions on the network.

2. The method of claim 1, wherein building a model of the network comprises:
    building a basic model, said basic model representing each communication link between nodes in the network; and
    building an enhanced model representing information inferred about the network.

3. The method of claim 2, wherein building a basic model comprises:
    receiving flow data records comprising application layer data extracted from the network, said flow data representing an information exchange between an application executing on a source device and an application executing on a destination device;
    for each flow data record creating a source node representing the source device and a destination node representing the destination device;
    creating an arc representing a communication flow between the application executing on the source node and the application executing on the destination node;
    storing statistical data describing the communication flow between application executing on the source device and application executing on the destination device in the corresponding nodes and arcs.

4. The method of claim 3, wherein the statistical data is based on number of flows between hosts, number of hosts, and probabilities associated with host behavior, and combinations thereof.

5. The method of claim 3, wherein the statistical data comprises packets in, packets out, bytes in, bytes out, available protocols, open ports, node probability, and combinations thereof.

6. The method of claim 2, wherein building a basic model comprises:
    building a flow topology representing a topological view of data flow connections which have been observed in the network;
    building a connectivity topology view showing connection arcs for connections which have not been observed but can potentially be made; and
    building a vulnerability topology representing an impact of a spread of one or more known vulnerabilities through the network.

7. The method of claim 6, wherein building a flow topology further comprises:
    for each node, calculating a node probability representing the probability of a host associated with the node being online.

8. The method of claim 6, wherein building a connectivity topology further comprises:
    determining whether any phantom connectivity arcs exist between two nodes, the phantom connectivity arc representing a likely path between two nodes that has not been observed; and
    determining whether any phantom port arcs exist, the phantom port arc representing a likely communication between the two nodes on an open port that has not been previously observed.

9. The method of claim 2, wherein the enhanced model comprises inferred arcs not present in the data flow records.

10. The method of claim 1, running a plurality of queries comprises:
    receiving a query request;
    generating a question model representing the received query; and
    computing simulation results for the received query based on the question model.

11. The method of claim 1, wherein the data traffic communicated between devices comprises communication port data.

12. The method of claim 1, wherein the communication arcs comprise an application communication from a source node to a destination node over a communication port.

* * * * *